Nov. 27, 1923.
I. TROLLEY
1,475,205
TRACTOR CONNECTION FOR AGRICULTURAL IMPLEMENTS
Original Filed July 17, 1918   3 Sheets-Sheet 1
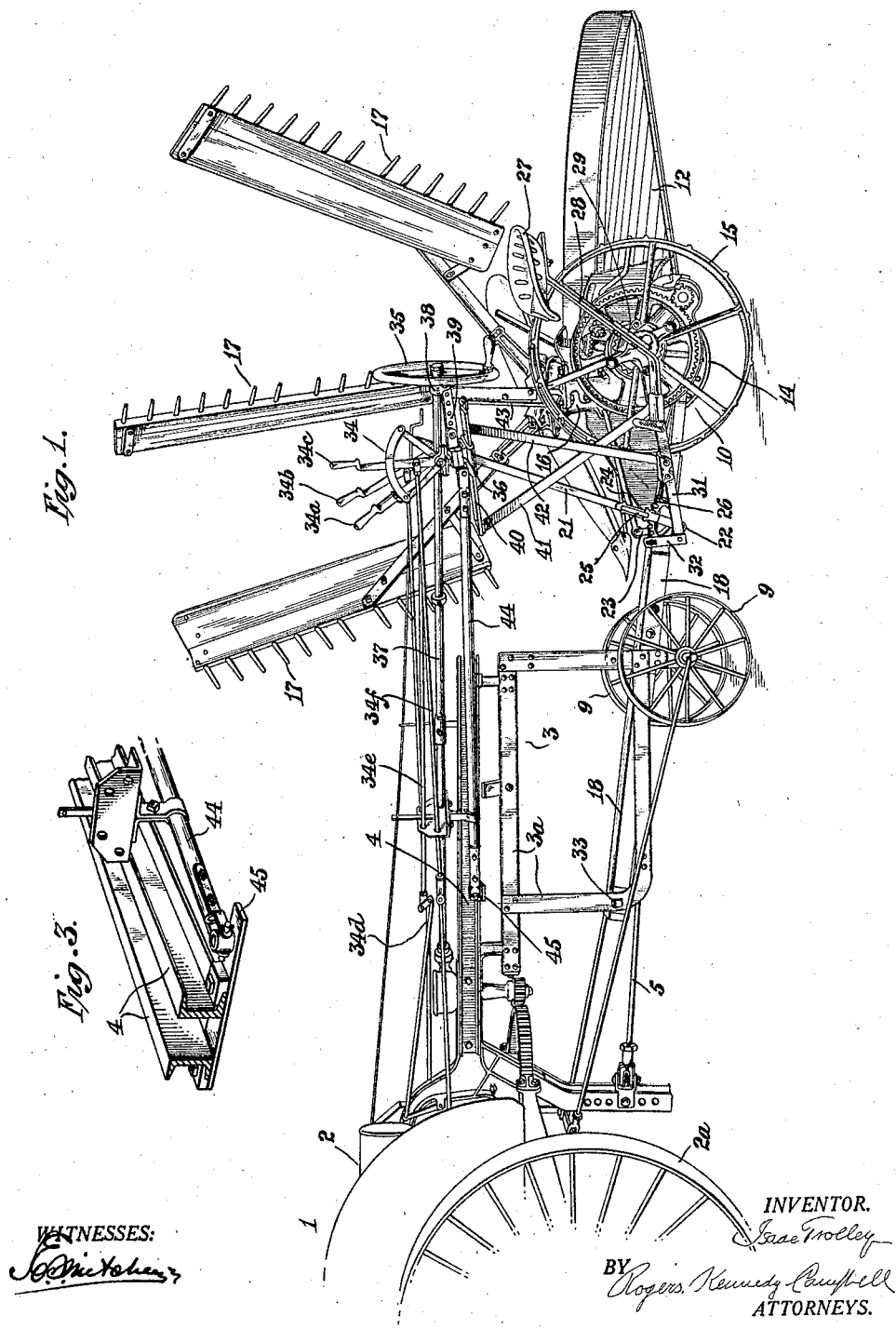
WITNESSES:
INVENTOR.
Isaac Trolley
BY Rogers, Kennedy Campbell
ATTORNEYS.

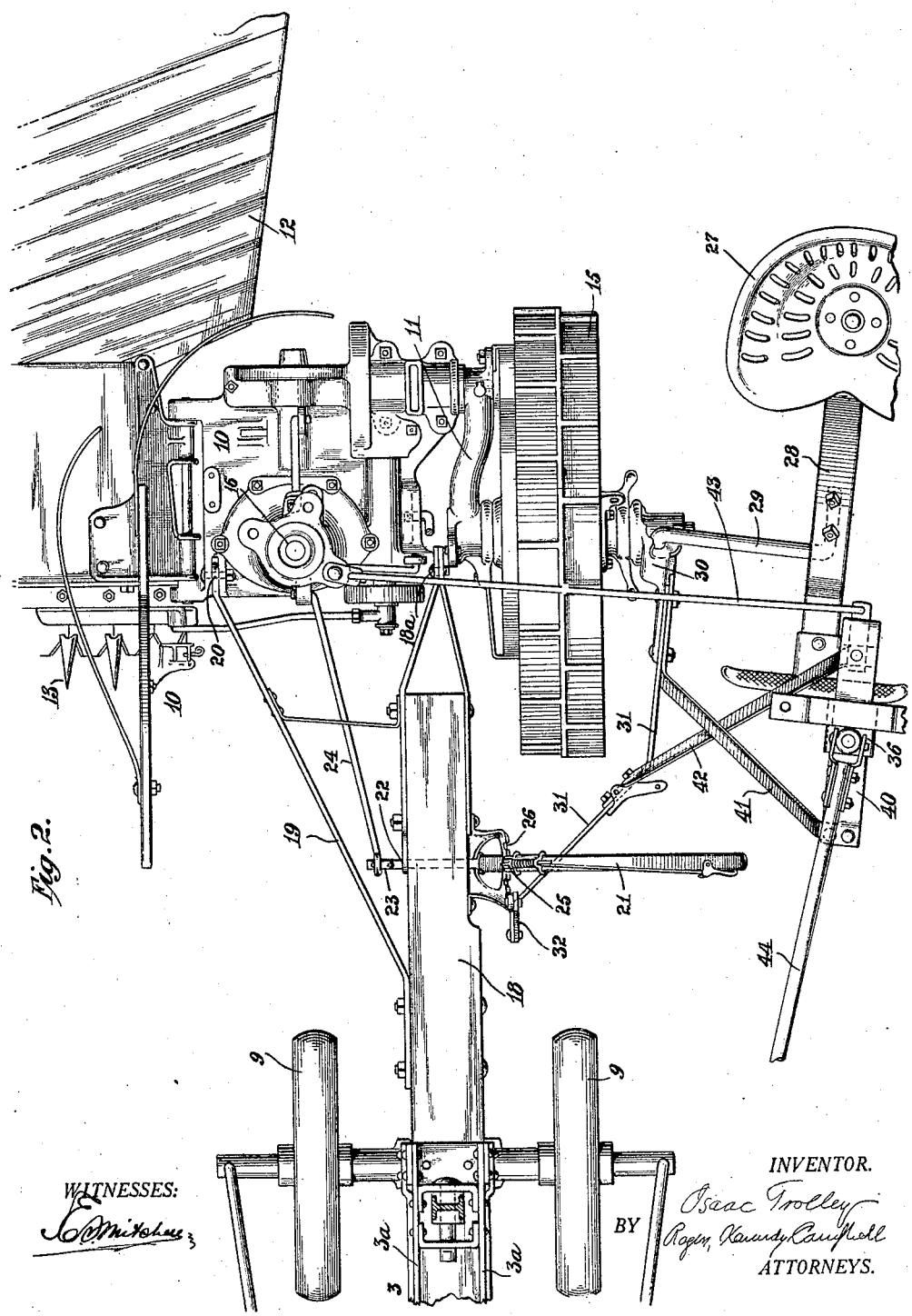

Nov. 27, 1923. 1,475,205
I. TROLLEY
TRACTOR CONNECTION FOR AGRICULTURAL IMPLEMENTS
Original Filed July 17, 1918 3 Sheets-Sheet 3

Inventor
Isaac Trolley
by S.C. Shonts Atty.

Patented Nov. 27, 1923.

1,475,205

UNITED STATES PATENT OFFICE.

ISAAC TROLLEY, OF POUGHKEEPSIE, NEW YORK, ASSIGNOR, BY MESNE ASSIGN-
MENTS, TO MOLINE PLOW COMPANY, INCORPORATED, OF MOLINE, ILLINOIS, A
CORPORATION OF VIRGINIA.

TRACTOR CONNECTION FOR AGRICULTURAL IMPLEMENTS.

Original application filed July 17, 1918, Serial No. 245,410. Divided and this application filed December 26, 1918. Serial No. 268,388.

*To all whom it may concern:*

Be it known that I, ISAAC TROLLEY, a citizen of the United States, residing at Poughkeepsie, in the county of Dutchess and State of New York, have invented certain new and useful Improvements in Tractor Connections for Agricultural Implements, of which the following is a specification, reference being had therein to the accompanying drawing.

This invention relates to means for connecting agricultural implements to tractors, so that the implement will trail behind the tractor in the travel of the latter through the fields. More particularly the invention has reference to the connection of reaping machines to tractors, the object of the invention being to admit of a relative vertical movement of the tractor and reaper in passing over uneven ground and preventing the weight and down-drag of the tractor from being imposed on the reaper; to enable the reaper to be tilted or adjusted relatively to the tractor to vary the height of cut; and to provide for the speedy attachment and detachment of the tractor and reaper. These and other objects and advantages are accomplished by the improved construction and arrangement of the parts particularly described in the specification to follow, and claimed in the appended claims.

In the accompanying drawings:

Fig. 1 is a perspective view of a reaping machine and the rear portion of a tractor, the two being connected together in accordance with my invention.

Fig. 2 is a top plan view on an enlarged scale of such portions of the tractor and reaper as will be necessary for an understanding of the invention, the two being connected together by my improved connecting means.

Fig. 3 is a perspective view of a detail showing the connection of the controlling lever support with the tractor.

Figure 4:
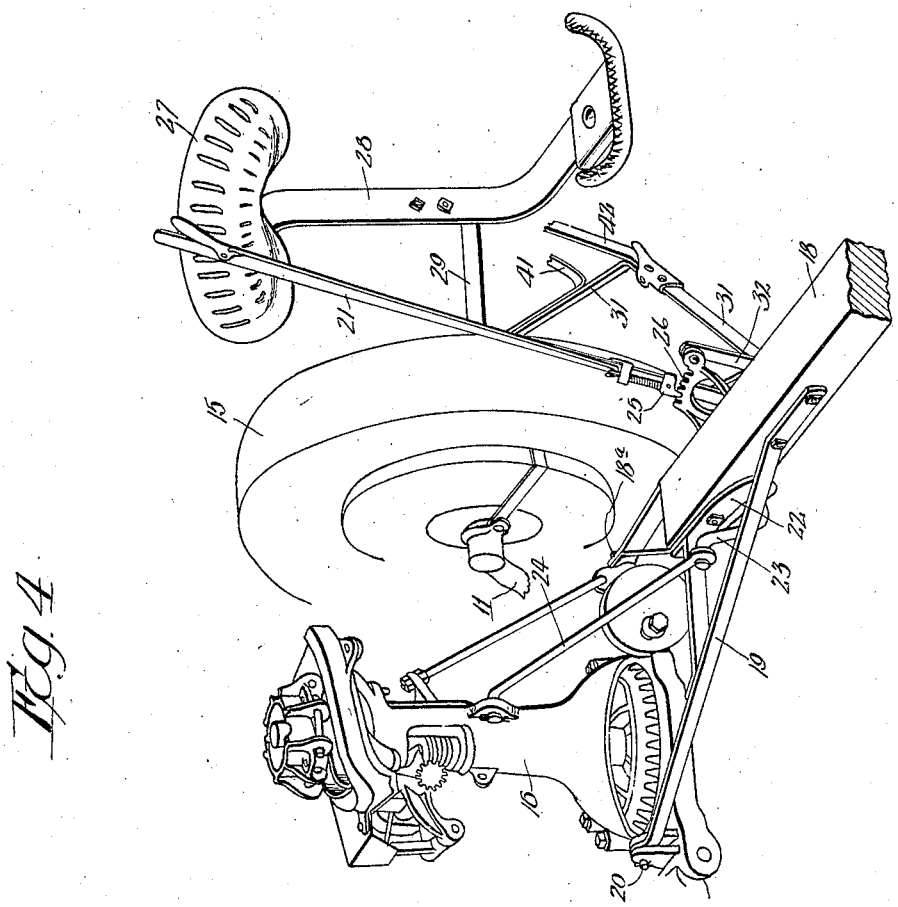
Fig. 4 is a front perspective looking down on the machine at an angle.

Referring to the drawings:

1 designates a tractor comprising a power unit 2 sustained by two power-driven traction wheels, one only of which, 2ª, is shown, and a supporting truck 3 which is arranged in rear of the power unit and beneath a horizontal beam 4 extending rearwardly from the power unit, by which means the equilibrium of the power unit is preserved. The draft pull of the power unit is applied to the supporting truck by means of a draft link 5 pivoted at its forward end to the power unit and pivoted at its rear end to the truck.

The truck comprises an upright rectangular frame, consisting of two side frames 3ª, spaced apart from each other and connected together in fixed relations, the rear end of this frame being sustained by a pair of truck wheels 9. As the details of the parts above described are the same as those fully set forth in an application for Letters Patent of the United States filed by me the 17th day of July, 1918, Serial No. 245,410, reference may be had to said application for a fuller description of the parts than is here given, the present description being sufficient for an understanding of this invention.

10 designates a reaping machine comprising, as usual, a sustaining frame 11, to which is hinged a grain platform 12 provided at its front with a cutter bar 13, the said frame and platform being sustained at the grain side by a grain wheel 14, and at the stubble side by a stubble wheel 15. A rake post 16 rises from the frame and gives support to a rotary rake 17, operated in the usual manner by a gearing from the stubble wheel. A draft pole 18 is pivoted at its rear end to the frame 11 as at 18ª, and is braced by means of a brace rod 19 fixed at its forward end to the side of the draft pole, and pivoted at its rear end to the frame 11 as at 20, the axes of the pivots 18ª and 20 being in transverse alignment with each other. A tilting lever 21 is fixed at its lower end to a horizontal journal 22 mounted in bearings on the under side of the pole, which journal is provided on its end with a crank arm 23 pivoted to the forward end of a link 24, whose rear end is pivoted to the rake post, so that by shifting the lever back and forth, the crank arm will be rocked and the frame 11 tilted on the axes of the pivots 18ª and 20 and the axis of the grain wheel, thereby raising and lowering the cutter bar to vary the height of the cut. The tilting lever is provided as usual with a locking latch 25 cooperating with a toothed segment frame 26 fixed to the side of the pole, so that the parts may be locked with the platform at the desired height. The driver's seat 27 is sustained at the outer side of the stubble wheel on a fore-and-aft extending seat bar 28 connected to the outer end of a transverse arm 29 sustained at its inner end by a collar 30 loosely surrounding the outer end of the stubble wheel axle. From this collar, a bar 31 extends forwardly and diagonally to the pole and has its forward end pivoted to the lower end of a link 32, which in turn is pivoted at its upper end to the pole. By this means the level of the seat is automatically preserved as the frame is tilted to vary the height of the cut. The automatic leveling of the operator's seat results from the following operation of the parts:

The axis of the pivots 18ª and 20 of the tongue is forward and lower than the axle of the wheel 15, which is the pivot about which the operator's seat moves. The link 24, which is pivoted at its forward end to the crank 23, is pivoted to the mower frame above and forward of the axle of the wheel 15. If the lever 21 is pushed forward from the position illustrated in Figure 1, the crank 23 moves forward pulling the link 24 forward and turning the mower frame forward or counter-clockwise about the axle of wheel 15. This lowers the cutting mechanism. The link 31 holds the collar 30 in position so that the seat 27 does not turn during this movement of the mower frame. If the frame of the mower is adjusted to raise or lower the cutting mechanism, the link 32 compensates for any such movement as far as the seat mounting is concerned with the result that the seat is always maintained level.

In accordance with my invention the draft pole, instead of being of the usual length when draft animals are employed to draw the reaper, is reduced in length and is in the form of a stub pole, which extends at its forward portion between the side frames 3ª of the truck and is pivoted at its forward end between said frames at the lower forward portion of the same on a transverse axis by means of a pivot bolt 33 extending through the side frames and the forward end of the stub pole; whereby the draft pull of the tractor is transmitted from the supporting truck to the reaper frame, and whereby a vertical relative motion of the supporting truck and reaper frame is permitted, in which motion the parts will rock about the pivot bolt 33. Due to this fact, the down-drag or weight of the tractor will be received wholly by the supporting truck and will not be imposed on the reaper.

The control of the tractor is effected by means of controlling devices 34 in the form of controlling levers 34ª, 34ᵇ, and 34ᶜ, and a steering wheel 35, the said levers being mounted on a bracket 36 and connected with the mechanism of the tractor by connecting rods 34ᵈ, 34ᵉ and 34ᶠ, respectively. The steering wheel 35 is fixed to the end of a rotary shaft 37, mounted at its rear end in a bearing 38 on an arm 39 connected with the bracket 36, the shaft being extended forwardly and connected with the steering mechanism of the tractor, similar to the arrangement in the application above referred to, and to which reference may be had for a more detailed description of these parts than is here given.

The bracket 36 is mounted to slide back and forth on a fore-and-aft extending guide plate 40 which is located above and adjacent the seat bar, and is sustained in position by means of two standards, one a standard 41 fixed at its upper end to the forward end of the guide plate, and extending inwardly and rearwardly and fixed at its lower end to the bar 31 before alluded to, and the other a standard 42 which is fixed at its rear end to the rear end of the guide plate, and which extends forwardly and inwardly and is connected at its forward end to said bar 31, these two standards sustaining the guide plate so that the controlling devices will be within reach of the driver occupying the usual driver's seat of the reaper. The guide plate is further sustained by means of a rod 43 pivoted at its outer end to the rear end of the guide plate, and pivoted at its inner end to the rake post. The slide bracket 36 is connected to the beam 4 of the tractor by means of a connecting rod or link 44, pivoted at its rear end on vertical transverse axes to the slide bracket, and pivoted at its forward end on vertical and transverse axes to a plate 45 clipped to the beam. This connection of the slide bracket with the beam of the tractor, maintains a uniform distance between the controlling devices carried by the slide bracket and the mechanism of the tractor connected to said controlling devices, notwithstanding the varying distances between the reaper frame and tractor due to the relative vertical motions of the parts in passing over uneven ground, and due to the tilting adjustments of the reaper to vary the height of cut.

It will be noted from the foregoing description that the guide plate 40 sustaining the slide 36 is supported from the bar 31, which maintains the level of the driver's seat, and consequently the proper and horizontal position of the guide plate is maintained, without regard to the varying position of the reaper frame relative to the tractor.

The tractor, connected with the reaper in the manner above set forth and controlled by the driver occupying the customary driver's seat on the reaper, will be drawn through the field, the two devices accommodating themselves independently of each other to the uneven ground as they travel thereover, the down-drag or weight of the tractor being prevented from being imposed on the reaper, and the driver having complete control of the tractor and being enabled by the usual tilting lever, to tilt or adjust the reaper frame relative to the tractor and thereby vary the height of the cut.

In the foregoing description and accompanying drawings, I have set forth my invention in the particular detailed form which I prefer to adopt and which in practice has been found to answer to a satisfactory degree the ends to be attained. It will be understood, however, that these details may be variously changed and modified by the skilled mechanic without departing from the limits of the invention; and further, it will be understood that the invention is not limited to any particular form or construction of the parts, except in so far as such limitations are specified in the claims.

Having thus described my invention, what I claim and desire to secure by Letters Patent of the United States, is as follows:

1. The combination with a tractor of the unstable type, of an implement, draft connections between the implement and tractor, means for tilting the implement about a horizontal axis, controlling means for the tractor, and mechanism supporting the controls so that they will be available for manipulation by the operator on a seat on the implement, said mechanism serving to automatically and positively maintain the controls in substantially the same horizontal position in all adjusted positions of the implemnet.

2. The combination with a tractor of the unstable type, of an implement having an operator's seat movably mounted thereon, draft connections between the tractor and implement, means for tilting the implement about a horizontal axis including mechanism to automatically maintain the operator's seat in substantially the same position in all adjusted positions of the implement, tractor controlling means extending forward to the tractor, and mechanism for mounting the controlling means associated with the tilting mechanism so that the tractor controls remain in substantially the same horizontal position for all adjusted positions of the implement.

3. The combination with a two wheel tractor of the unstable type having a steering frame extending rearwardly, of a stabilizing truck, a reaper having an operator's seat at one side thereof, draft connections between the reaper and truck permitting the reaper to move relative to the truck about a substantially transverse, horizontal axis, means for tilting the reaper about a horizontal axis, controlling devices for the tractor, and means for mounting the controlling devices so that they are available for manipulation from the operator's position on the reaper, and so that they will not be disturbed by any movements or adjustments of the reaper relative to the tractor.

4. In combination with a tractor, an implement provided with a stubble wheel, a draft member pivoted respectively to the frame of the implement and to the tractor, a seat bar structure movably sustained by the frame of the implement at the stubble side of the stubble wheel and extending forwardly and connected movably with the draft member, and controlling devices for the tractor sustained by said seat bar structure and operatively connected with the tractor mechanism.

5. In combination with a tractor, an implement having a stubble wheel, a draft pole connecting the implement with the tractor to cause the implement to trail behind the tractor, a seat bar sustained on the stubble side of the stubble wheel, a connecting device between the seat bar and draft pole, and controlling devices for the tractor sustained by said connecting device and operatively connected with the tractor mechanism.

6. In combination with a tractor, an implement provided with an axle having a ground wheel mounted thereon, a draft pole pivoted to the implement and tractor respectively, adjusting means sustained by the draft pole and connected with the implement for adjusting the implement vertically relatively to the tractor, a collar loosely surrounding the axle, a seat bar sustained by said collar, a bar extending forwardly from the collar and movably connected with the draft pole, and controlling devices for the tractor sustained by the forwardly extending bar and operatively connected with the tractor mechanism.

7. In combination with a tractor, an implement, a draft member movably connected with the implement and tractor to cause the implement to trail behind the tractor, means for adjusting the implement vertically relatively to the tractor, a connecting device movably connected with the implement and draft member respectively, and controlling devices for the tractor sustained by said connecting device and operatively connected with the tractor mechanism.

8. In combination with a tractor, an implement, a draft device pivoted respectively to the implement and tractor to cause the implement to trail behind the tractor, means sustained by the draft device and connected with the implement for adjusting the implement and tractor vertically relatively to each other, a substantially horizontal member movably connected respectively with the implement and draft device and adapted in the relative movements of the implement and tractor to preserve its horizontal position, and controlling devices for the tractor sustained by said horizontal member and operatively connected with the tractor mechanism.

9. In combination with a tractor, an implement, a draft device pivoted respectively to the implement and tractor to cause the implement to trail behind the tractor, means sustained by the draft device and connected with the implement for adjusting the implement vertically relative to the tractor, a substantially horizontal member movably connected with the implement and draft device, a driver's seat sustained by said member, and controlling devices for the tractor also sustained by said member and operatively connected with the tractor mechanism.

10. In combination with a tractor, an implement, a draft pole pivoted to the implement and tractor respectively to cause the implement to trail behind the tractor, a fore-and-aft extending bar movably connected with the implement and draft pole respectively, standards rising from said bar, a plate supported by said standards, and controlling devices for the tractor sustained by said plate and operatively connected with the tractor mechanism.

11. In combination with a tractor, an implement, a draft pole pivoted to the tractor and implement respectively, a fore-and-aft extending bar movably connected with the implement and draft pole respectively, standards rising from said bar, a plate supported by said standards, a link connecting said plate with the frame of the implement, and controlling devices for the tractor sustained by said plate and operatively connected with the tractor mechanism.

12. In combination with a tractor, an implement provided with a stubble wheel, a draft pole pivoted to the implement and tractor respectively to cause the tractor to trail behind the implement, a fore-and-aft extending bar movably connected at its rear end with the implement at the stubble side of the stubble wheel, and movably connected at its forward end with the draft pole, standards rising from said bar, a plate connected to and supported by the upper ends of said standards, a link pivoted at its outer end to the plate and pivoted at its inner end to the frame of the implement, and controlling devices for the tractor supported by said plate and operatively connected with the tractor mechanism.

13. In combination with a tractor, an implement provided with a rake post and with a stubble wheel, a draft pole pivoted to the implement and tractor respectively to cause the implement to trail behind the tractor, a fore-and-aft extending bar movably connected at its rear end with the implement at the stubble side of the stubble wheel, and movably connected at its forward end with the draft pole, standards rising from said bar, a plate connected to and supported by the upper ends of said standards, a link pivoted at its outer end to the rear end of the plate and pivoted at its inner end to the rake post, and controlling devices for the tractor supported by said plate and operatively connected with the tractor mechanism.

In testimony whereof, I have affixed my signature hereto.

ISAAC TROLLEY.